US011920641B2

(12) United States Patent
Kleinewegen et al.

(10) Patent No.: US 11,920,641 B2
(45) Date of Patent: Mar. 5, 2024

(54) COUPLING FOR INDUSTRIAL APPLICATIONS, AND RAIL VEHICLE

(71) Applicant: Flender GmbH, Bocholt (DE)

(72) Inventors: Stefan Kleinewegen, Bocholt (DE); Michael Te Uhle, Rhede (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/028,342

(22) PCT Filed: Sep. 17, 2021

(86) PCT No.: PCT/EP2021/075586
§ 371 (c)(1),
(2) Date: Mar. 24, 2023

(87) PCT Pub. No.: WO2022/063691
PCT Pub. Date: Mar. 31, 2022

(65) Prior Publication Data
US 2023/0304538 A1    Sep. 28, 2023

(30) Foreign Application Priority Data

Sep. 25, 2020   (EP) .................................... 20198260

(51) Int. Cl.
*F16D 3/68*     (2006.01)
*B61F 3/00*     (2006.01)
*F16D 3/64*     (2006.01)

(52) U.S. Cl.
CPC ............... *F16D 3/68* (2013.01); *B61F 3/00* (2013.01); *F16D 3/64* (2013.01); *Y10S 464/90* (2013.01); *Y10S 464/902* (2013.01)

(58) Field of Classification Search
CPC ..... F16D 3/68; F16D 3/64; B61F 3/00; Y10S 464/90; Y10S 464/902
USPC ................................... 464/73, 81, 85
See application file for complete search history.

(56) References Cited

U.S. PATENT DOCUMENTS

| 496,330 A | * | 4/1893 | Depoele | B61C 9/44 |
| | | | | 464/82 |
| 2,019,153 A | * | 10/1935 | Meyer | F16D 43/18 |
| 3,830,081 A | * | 8/1974 | Weber | F16D 3/68 |
| | | | | 464/902 |

FOREIGN PATENT DOCUMENTS

| DE | 2421663 A1 | 11/1975 |
| DE | 102004009249 A1 | 5/2005 |
| DE | 102008017679 A1 | 10/2009 |

(Continued)

OTHER PUBLICATIONS

International Search Report Issued by the European Patent Office in International Application PCT/EP2021/075586 dated Nov. 25, 2021.

*Primary Examiner* — Greg Binda
(74) *Attorney, Agent, or Firm* — Henry M. Felereisen LLC

(57) ABSTRACT

A coupling includes a claw part and an intermediate piece. The intermediate piece includes a tube piece produced from aluminum or from an aluminum alloy, and a buffer part received in an end region of the tube piece and including elastic damping elements for receiving the claw part. The damping elements are surrounded by the end region radially at an outside in a circumferential direction. The buffer part includes a part which is different from the damping elements and is produced from a material of a brittleness which is greater than a brittleness of the tube piece.

14 Claims, 2 Drawing Sheets

(56) References Cited

FOREIGN PATENT DOCUMENTS

DE    102012007822 A1    10/2013
EP         3088757 A1    11/2016

* cited by examiner

10: Coupling
64: Transmission

US 11,920,641 B2

COUPLING FOR INDUSTRIAL APPLICATIONS, AND RAIL VEHICLE

CROSS-REFERENCES TO RELATED APPLICATIONS

This application is the U.S. National Stage of International Application No. PCT/EP2021/075586, filed Sep. 17, 2021, which designated the United States and has been published as International Publication No. WO 2022/063691 A1 and which claims the priority of European Patent Application, Serial No. 20198260.0, filed Sep. 25, 2020, pursuant to 35 U.S.C. 119(a)-(d).

BACKGROUND OF THE INVENTION

The invention relates to a coupling having improved safety properties and being suitable for use in industrial applications and rail vehicles. The invention equally relates to a corresponding industrial application and to a corresponding bogle for a rail vehicle. The invention furthermore relates to a computer program product which is configured for simulating an operating behavior of such a coupling.

DE 10 2004 009249 A1 has disclosed an articulated shaft in the case of which two shaft ends, facing toward one another, of shafts to be connected to one another are coupled in each case via a claw coupling in a rotationally conjoint manner to a tube, of which tubes one tube can be pushed into the other tube. The respective tube has a coupling plate with axially protruding claws which interact via an elastic buffer element with the claws of the assigned shaft end in order to form the respective claw coupling. Protruding from the respective coupling plate are tube pieces which are able to be pushed one inside the other and have a smaller outer diameter than the coupling plate and the associated claws. The claws of the shaft ends and of the tubes and also the buffer elements are positioned spaced axially apart from the hollow-cylindrical tube piece.

DE 10 2012 007822 A1 has disclosed an articulated shaft in the case of which two shaft ends, facing toward one another, of shafts to be connected to one another are connected in each case via a claw coupling to an interposed tube. The shaft ends and the respective axial end regions of the tube have, for forming the respective claw coupling, axially protruding claws between which an elastic buffer element is provided. The outer lateral surfaces of the tube, of the respective claws and of the respective buffer element are arranged at a common radius. The claws of the shaft ends and of the tube and also the buffer elements are positioned spaced axially apart from a hollow-cylindrical region of the tube.

EP 3 088 757 A1 has disclosed a claw coupling in the case of which claws protruding axially from a respective shaft to be connected are coupled in a torque-transmitting manner via an elastic buffer element.

It is known from DE 10 2008 017679 A1 to mesh an inner part, which is couplable to a shaft via a radially inner spline toothing, with a radially outer part, wherein elastic elements are provided in tooth intermediate spaces between an outer toothing of the inner part and an inner toothing of the outer part.

Increasing demands are being placed on couplings in terms of torque transmission, compensation capability and reliability. In particular, good emergency-running properties are sought. Also, simple and economical producibility is desired. The invention is based on the object of providing a coupling which offers an improvement in at least one of the aspects described.

SUMMARY OF THE INVENTION

The object is achieved by a coupling as set forth hereinafter. Preferred configurations are specified in the dependent claims and the following description, which may in each case individually or in combination represent an aspect of the Invention. If a feature is presented in combination with another feature, this serves only for simplified presentation of the invention and is in no way intended to mean that this feature cannot also be a development of the invention without the other feature.

One aspect of the invention relates to a coupling which comprises an intermediate piece and at least one claw part. The claw part may have a plurality of axially protruding claws by way of which torque is able to be transmitted to the intermediate piece or from the intermediate piece to the claw part. At least one buffer part, in which elastic damping elements are able to be received, is received in the intermediate piece. The elastic damping elements, during operation of the coupling as intended, are in contact with the claws and accommodate, in relation to a main axis of rotation of the coupling, a circumferential force. According to the invention, in addition to the at least one buffer part, the intermediate piece also comprises a tube piece. The tube piece is in particular of substantially hollow-cylindrical form and configured to transmit the torque which is directed by way of the at least one buffer part. According to the invention, the at least one buffer part is received in an in particular hollow-cylindrical end region of the tube piece. In this case, the elastic damping elements of the at least one buffer part are substantially surrounded by the tube piece. That is to say, as viewed in a radial direction, the buffer part inserted into the end region of the tube piece, with its damping elements, is covered by the material of the tube piece over the entire circumferential angle of 360°. The buffer part, in particular the at least one damping element, can be inserted, preferably with a clearance fit or press fit, at least partially, in particular to a large extent, preferably completely, into a cavity which is delimited by the tube piece in the end region. The elastic damping elements of the buffer part are consequently positioned, in relation to the main axis of rotation of the coupling, radially inside a wall of the tube piece. The elastic damping elements are thus substantially surrounded when mounted. In the event of failure of the elastic damping elements, for example breaking of a damping element off from the buffer part, flinging-away of the damping elements is prevented. The fragments of the elastic damping elements that are formed in the event of the failure are consequently retained and still offer a reduced damping action for an emergency running of the coupling, which is initiated due to the failure. The coupling according to invention thus has improved emergency-running properties even in the case of undesired operating states, as a result of which further damage can be avoided. Furthermore, the intermediate piece, with the claw part, is held in secure engagement, flinging-away of the intermediate piece thus being prevented. In this way, operational reliability, for example of an industrial application or of a bogle of a rail vehicle, is increased. Likewise, flinging-out of the intermediate piece in an undesired operating state is prevented.

In particular, the claws of the claw part are received in the end region of the tube piece and, at least over a part of an axial extent, preferably over the entire axial extent, of the claws, are surrounded by the end region radially at the outside in a circumferential direction. The claws of the claw part, too, can be inserted, preferably with a clearance fit or press fit, into an interior space which is delimited by the tube piece in the end region. In this way, the tube piece can, as a rupture protection means, retain radially inside the tube piece claws which have broken off as a result of a component failure, and prevent centrifugal-force-induced flinging-away of the claws that have broken off.

Preferably, a part of the buffer part that is different from the damping elements is produced from a material which is more brittle in comparison with the tube piece, in particular gray cast iron. In comparison with the part of the buffer part that is different from the damping elements, the tube piece may be produced from a more ductile material, for example aluminum or steel. The tube piece can be easily distorted and provide an additional rotational elasticity, while the buffer part can provide substantially non-compliant tangential stops for the elastic damping elements, in order to make possible elastic abutment of the tangential stop, formed by the brittle part of the buffer part, against the associated claw of the claw part via the elastic damping element pressed therebetween in a defined rotational-angle range. The elastic damping elements are preferably fastened, in particular in a substantially rotationally conjoint manner, to the rest of the buffer element. Alternatively, the elastic damping elements may be inserted in a non-fastened and relatively rotatable manner in the rest of the, for example U-shaped and/or pocket-shaped, buffer part, wherein in this case the elastic damping elements are preferably connected to one another in one piece via a common ring. If the elastic damping elements are fastened, for example adhesively bonded, to the rest of the buffer element, the ring may be saved and the individual damping elements may be formed separately in a manner spaced apart from one another. If, in the event of an overload, a part of the brittle portion of the buffer part, in particular a tangential stop, and/or an elastic damping element, which is particularly brittle in particular at low temperatures, break(s) off, the ductile tube piece can retain the broken-off parts. Breakage of the tube piece can be avoided since, in a extreme case, the tube piece would deform plastically rather than break.

In one embodiment of the claimed coupling, the buffer part, in particular the part of the buffer part that is different from the damping elements, has a profile which is of substantially C-shaped or J-shaped form as viewed in a longitudinal section along the main axis of rotation. In addition to the end region of the tube piece, the elastic damping elements may also be surrounded radially at the outside in a circumferential direction by the rest of the buffer part. A C-shaped profile allows the elastic damping elements to be surrounded on three sides and allows prevention of flinging-away or dropping-out of fragments of the damping elements. The C-shaped profile gives the buffer part an increased stiffness. The C-shaped profile is able to be axially elongated, that is to say axially deepened, constructively in a simple manner. In this way, damping elements having an increased axial dimension are able to be received in the intermediate piece and, at the same time, the axial dimensions of the coupling are able to be maintained. A C-shaped profile for the buffer part is easy to produce. Furthermore, buffer parts of said type are compact, and are easy to produce independently of other components of the coupling. The manufacture of the claimed coupling is consequently made more flexible and thus more cost-effective. Alternatively, the buffer part may also have a substantially J-shaped profile as viewed in longitudinal section. In the case of a J-shaped profile, one encircling wall of the buffer part, in an axial direction, is shorter than the other encircling wall. In this way, material is able to be saved in a radially inner region of the buffer part, which in turns results in a weight saving.

In one embodiment of the claimed coupling, the tube piece belonging to the intermediate piece may be produced from aluminum or from an aluminum alloy. The use of aluminum or aluminum alloy allows the tube piece to be formed with an increased wall thickness at a reduced or at least unchanged weight in comparison with steel. Furthermore, aluminum or aluminum alloys has/have an increased toughness. This in turn results in an increased torsional stiffness of the tube piece. The increased wall thickness also results in tolerances which, when considered as absolute values, are increased, this in turn making it possible for the manufacture of the tube piece to be carried out in a simple manner. Overall, it is thus the case that a load-appropriate selection of materials for the coupling is possible. Alternatively or additionally, the at least one buffer part may be produced from a cast material, for example gray cast iron. Cast material offers increased compressive strength, wear resistance and economy. In this way, too, the principle of load-appropriate material selection is further realized.

In a further embodiment of the claimed coupling, a buffer part and a claw part are arranged at each of the two end regions of the tube piece. The intermediate piece is consequently mounted so as to be stable on both sides. In the event of failure of one or more elastic damping elements, it is ensured that a coupling arrangement having sufficient compensation capability is formed at the opposite end region. In particular, a situation in which, in the event of failure of an elastic damping element, the intermediate piece is deflected to such an extent that it is released from the coupling is prevented. The claimed coupling is therefore robust and reliable.

Furthermore, the at least one buffer part may be connected to the tube piece via an adhesive-bonding connection. The adhesive-bonding connection may in this case be formed on an encircling outer surface of the buffer part, which outer surface, in the mounted state, bears substantially against an inner wall of the tube piece. The larger the axial dimensions of the at least one buffer part are, the larger, and thus more loadable, the adhesive-bonding surface able to be formed with the tube piece is. An adhesive-bonding connection allows formation of a clearance fit between the buffer part and the tube piece. The clearance fit may in this case be produced with increased tolerances since the adhesive-bonding gap predefined in this way, in the mounted state, is filled with adhesive anyway. Furthermore, neither the buffer part nor the tube piece requires an extensively reworked, smooth surface in the region of the adhesive-bonding connection. Rather, during production, a rough surface which, owing to its roughness, offers increased adhesive action is able to be maintained in the region of the adhesive-bonding connection. Accordingly, the claimed coupling is cost-effectively producible.

Furthermore, a coupling joint may be formed by the at least one buffer part and the associated claw part. The coupling joint allows compensation of an offset between the intermediate piece and the corresponding claw part. The offset may be in the form of an axial offset, angular offset or combination thereof. For this purpose, the claws, the buffer part and/or the elastic damping elements are/is formed with corresponding clearances, which offer a sufficient amount of space for the respective offset. In embodiments in which the intermediate piece is provided on both sides with buffer parts of said type into which claw parts engage, a double-joint coupling is thus realized. Owing to the two joint planes, that is to say coupling joints, the compensation required for an offset is thus divided among two claw parts. The two coupling joints are in each case both automatically deflected only by a minimum. There is thus only a slight increase in the wear at the coupling due to the offset. Accordingly, the claimed coupling offers increased service life and reliability.

Furthermore, at least one of the elastic damping elements arranged in the buffer part may be produced by way of additive manufacturing. Elastomers which have good damping properties can be produced with sufficient accuracy by means of additive manufacturing and are easily adaptable in terms of construction. It is also possible for elastic damping elements produced via additive manufacturing to be provided with sensors. The sensors may be formed on an outer side of the elastic damping elements and/or in the interior thereof. The sensors may in each case be in the form of temperature sensors, pressure sensors or wear sensors. In this way, a space-saving, increased functional integration is achieved. Alternatively or additionally, at least one of the elastic damping elements may be produced from an electrically insulating material. In this way, it is easy to produce electrical insulation between a claw part and the intermediate piece.

In a further embodiment of the claimed coupling, at least one of the elastic damping elements may be designed to be separately mountable and dismountable. For example, the elastic damping elements may be insertable into the buffer part in a force-fitting manner. For this purpose, the respective elastic damping element may be formed in a substantially H-shaped or cross-shaped manner. The elastic damping elements are thus able to be changed in a targeted manner according to their state of wear. The maintenance outlay, in particular a replacement-parts requirement for the claimed coupling, is consequently able to be reduced.

The claimed coupling may have a collar on the at least one buffer part, which collar serves as an axial stop. In particular, the collar is produced from an electrically insulating material, for example plastic, for interrupting a creepage current flow between the claw part and the buffer part. The collar essentially constitutes a region with an increased outer diameter that is not able to be received in the tube piece. When the buffer part is mounted in the tube piece, its axial position is limited by the collar. An adhesive-bonding connection is able to be formed between an end face of the tube piece and the collar and additionally supports the buffer part against rotation. The collar may be of encircling form or segmentally interrupted. The collar is able to be produced by way of machining at a lathe and can accordingly be precisely aligned. The tube piece and the buffer part can consequently be aligned with one another precisely in a simple manner. A misalignment of the buffer part, which brings about increased wear as well as an offset between the buffer part and the corresponding coupling part, is in this way avoided. An encircling collar forms with the tube piece an encircling gap at which an adhesive-bonding connection is able to be formed, said adhesive-bonding connection offering additional securing against rotation of the buffer part. A segmentally interrupted collar offers a further weight saving. Moreover, in an installation situation in which a shaft in contact with the claw part is subjected to a creepage current, it is possible for electrical passing of the creepage current on to the other claw part, which is attached via the intermediate piece, to be interrupted. In this way, the coupling may be used even in electrically loaded environments.

Furthermore, a cover may be arranged on the at least one buffer part. In particular, the cover is produced from an electrically insulating material, for example plastic, for interrupting a creepage current flow between a shaft received in the claw part and the buffer part. The cover prevents ingress of dust, liquid or vapors into the interior of the intermediate piece. In particular, the ingress of liquids or vapors, which act in a destructive manner on an adhesive-bonding connection between the at least one buffer part and the tube piece, is prevented. The service life of the intermediate piece and thus of the coupling is consequently increased. This protection makes the use of an adhesive-bonding connection in the intermediate piece technically practicable and thus makes the technical advantages thereof usable. Furthermore, such a cover may protrude axially and thus serve as a stop for a shaft and/or a claw part. In this way, noise decoupling between the intermediate piece and the shaft or the claw part is achieved and consequently noise generation during operation is reduced. Moreover, in an installation situation in which a shaft received in the claw part is subjected to a creepage current, it is possible for electrical passing of the creepage current on to the other claw part, which is attached via the intermediate piece, to be interrupted. In this way, the coupling may be used even in electrically loaded environments.

The underlying object is also achieved by an industrial application according to the invention. The industrial application comprises a drive unit by way of which a drive power is provided. The drive unit may be in the form of an electric motor, combustion engine, hydraulic motor, turbine wheel or flywheel. The drive power is connected via a coupling to an output unit which is a mechanical application by way of which the function of the industrial application is defined. The industrial application may overall be in the form of a mill, rolling mill, cement mill, sugar mill, extruder, conveying installation, rock crusher, roller crusher, stirring unit, stirring comminutor, rotary furnace, roller press, rolling press, pump, fan, lifting apparatus, scrap press or waste press. In this case, the coupling is, according to the invention, designed according to one of the embodiments outlined above.

The object described in the introduction is also achieved by a bogie for a rail vehicle, which comprises a traction motor which is connected in a torque-transmitting manner to a wheel. Furthermore, a transmission may be arranged between the wheel and the traction motor. According to the invention, the bogie has a coupling via which the traction motor is connected to the wheel. In this case, the coupling is designed according to one of the embodiments outlined above.

The object that has been outlined is equally achieved by a computer program product according to the invention that is configured for simulating an operating behavior of a coupling used in an industrial application or in a rail vehicle. The operating behavior is to be understood as meaning for example a deflection behavior or wear behavior of individual components. It is also possible for kinematics and/or a vibration characteristic of the coupling to be simulated by means of the computer program product. The operating behavior of the coupling is consequently able to be simulated in a mounted state in the industrial application or the rail vehicle. This may encompass both a productive operation and a maintenance operation. The coupling is accordingly represented in terms of its physical behavior in the computer program product according to the invention, and may be provided with a data interface by way of which further simulation-oriented computer program products can transfer input values to the computer program product according to the invention. Equally, the computer program product may also be provided with a data interface for transferring output values of the computer program product according to the invention to further simulation-oriented computer program products. The computer program product may be in the form of a so-called digital twin. According to the invention, the coupling for which simulations may be performed by the claimed computer program product is designed according to one of the embodiments outlined above.

BRIEF DESCRIPTION OF THE DRAWING

The invention will be discussed in more detail below on the basis of individual embodiments in figures. The figures are to be viewed in a mutually complementary manner insofar as the same reference signs in different figures have the same technical meaning. The features of the individual embodiments can also be combined with one another. Furthermore, the embodiments shown in the figures can be combined with the features outlined above. In the figures, specifically.

DETAILED DESCRIPTION OF PREFERRED EMBODIMENTS

Figure 1:
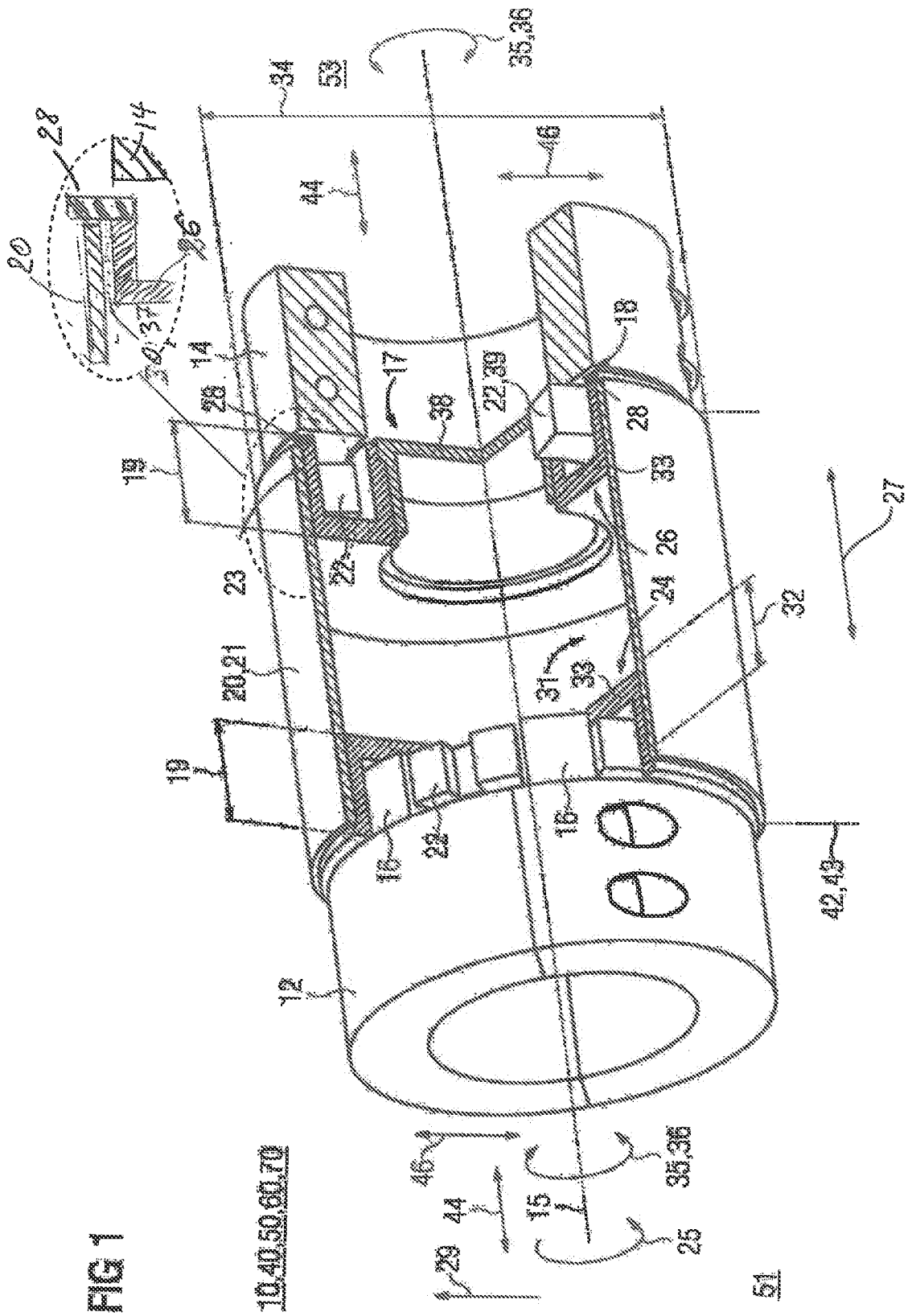
FIG. 1 schematically shows a first embodiment of the claimed coupling in a sectional illustration.

A sectional illustration of a first embodiment of a claimed coupling 10 is shown in FIG. 1. The coupling 10 comprises a first coupling part 12 and a second coupling part 14, which are connected to an intermediate piece 20. The claw parts 12, 14 each have a plurality of claws 16 which engage into the intermediate piece 20. A rotation of the first claw part 12 about a main axis of rotation 15 of the coupling 10 is transmitted as torque 25 to the intermediate piece 20, and from there to the second coupling part 14. The torque 25 is supplied by a first power shaft 51 (not illustrated in any more detail) and is removed via a second power shaft 53 (not shown in any more detail). The intermediate piece 20 comprises a tube piece 21 which is provided in each of its end regions 19 with a buffer part 24. At least one of the buffer parts 24 is produced from a cast material, in particular gray cast iron. The tube piece 21 is produced from aluminum or from an aluminum alloy and has an outer diameter which defines the largest outer diameter 34 of the coupling 10.

The buffer parts 24 in the end regions 19 of the tube piece 21 have a substantially C-shaped profile 26 as viewed in longitudinal section. In each case an outer surface 23 of the buffer parts 24 bears against an inner wall 31 of the tube piece 21 and is connected via an adhesive-bonding connection 30 to the tube piece 21. The tube piece 21 and the buffer parts 24 are in each case designed in such a way that an adhesive-bonding gap 37 is formed therebetween in a non-adhesively-bonded state. In the region of the adhesive-bonding gap 37, the outer surface 23 of the buffer part 24 and the tube piece 21 have increased roughness in order for the load capacity of the adhesive-bonding gap 37 to in this way be increased. An adhesive-bonding-gap length 32 between the respective buffer part 24 and the tube piece 21 is defined by a dimension of the corresponding buffer part 24 in an axial direction 27. The larger the adhesive-bonding-gap length 32 is, the greater the mechanical load capacity of the adhesive-bonding connection 30 is. The buffer parts 24 furthermore each have a collar 28 which forms a stop and in this way limits the position of the buffer parts 24 in the tube piece 21 in an axial direction 27. The collars 28 in each case ensure a spatial alignment of the buffer parts 24. In the buffer parts 24, there is arranged in each case a plurality of elastic damping elements 22 which, during operation of the coupling 10 as intended, exert tangential forces 17 on the claws 16 or on which tangential forces 17 are exerted by the claws 16. The elastic damping elements 22 are fastened in a force-fitting and/or form-fitting manner to the respective buffer part 24 via holding projections 33. Via the tangential forces 17, pressure loads are induced in the respective buffer part 24. At least one of the elastic damping elements 22 is produced by means of additive manufacturing and is equipped with a sensor 39 (not illustrated in any more detail). The sensor 39 is in this case positioned in the interior of the elastic damping element 22.

The coupling 10 has a collar 28 on the at least one buffer part 24, which collar 28 serves as an axial stop. The collar is produced from an electrically insulating material, for example plastic, for interrupting a creepage current flow between the claw part 14 and the buffer part 24. The collar essentially constitutes a region with an increased outer diameter that is not able to be received in the tube piece 21. The collar 28 may be of encircling form or segmentally interrupted. An encircling collar 28 forms with the tube piece 21 an encircling gap 37 at which an adhesive-bonding connection 30 may be formed.

A cover 38 may be arranged on the at least one buffer part 24. The cover may be produced from an electrically insulating material, for example plastic, for interrupting a creepage current flow between the shaft 51, 52 received in the claw part 14 and the buffer part 24.

The elastic damping elements 22 are surrounded on three sides by the respective buffer part 24. In this way, the elastic damping elements 22 are each separately mountable and dismountable. Arranged on a side of the respective buffer part 24 that faces away from the tube piece 21, that is to say the open side thereof, is in each case one claw part. In this way, the elastic damping elements 22 are substantially enclosed. In the event of failure of an elastic damping element 22, the latter breaks down into fragments which, by being enclosed, still allow an emergency operation of the coupling 10. The buffer parts 24, the claws 16 and the elastic damping elements 24 are dimensioned in such a way that a gap 18 of encircling form is present between the first or second claw part 12, 14 and the intermediate piece 20. This results in a joint plane 42 in relation to the intermediate piece 20 at the first and second claw parts 12, 14. Each of the joint planes 42 corresponds to a joint 43 and allows compensation of an angular offset 36 that is brought about by a tilting movement 35. Furthermore, an axial offset 44 and/or radial offset 56 are/is also able to be compensated between the intermediate piece 20 and the first or second claw part 12, 14. In this way, the coupling 10 constitutes a double-joint coupling 40. The coupling 10 is furthermore represented in a computer program product 70 which is configured to simulate the operating behavior of the coupling 10, for example in an industrial application 50 or in a rail vehicle 60.

Figure 2:
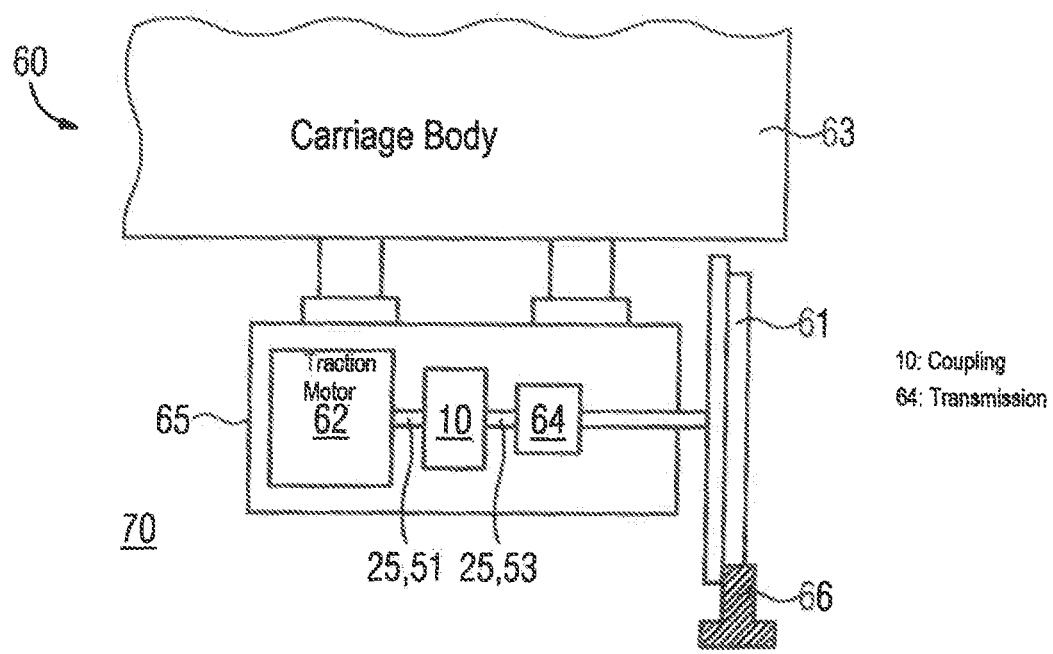
FIG. 2 shows a structure of an embodiment of a claimed bogie.
Figure 3:
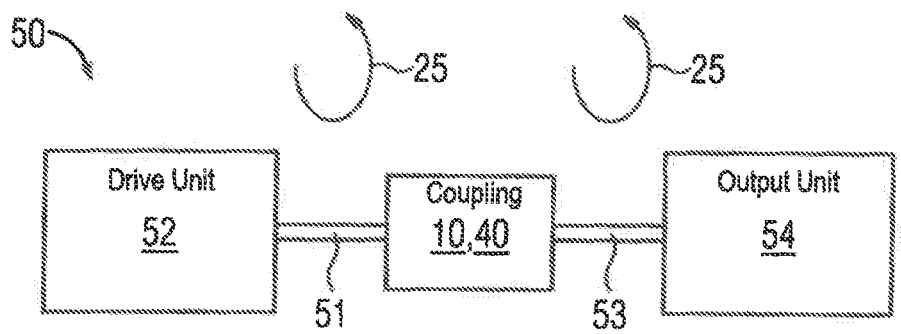
FIG. 3 shows a structure of an embodiment of a claimed industrial application.

FIG. 2 shows a schematic structure of an embodiment of a claimed bogie 65 which is used in a rail vehicle 60. The rail vehicle 60 comprises a carriage body 63 to which the bogie 65 is fastened. The bogie 65 comprises a traction motor 62 which is connected via a coupling 10 to a transmission 64 in order to drive a wheel 61 that rolls on a rail 66. For this purpose, the coupling 10 is torque 25 is supplied to the coupling 10 by way of a first power shaft 51 and the torque 25 is removed via a second power shaft 53. The coupling 10 is designed according to one of the embodiments outlined above, for example according to the double-joint coupling 40 as per FIG. 1. The coupling 10 is in this case represented in a computer program product 70 by way of which the operating behavior of the coupling 10 during operation of the bogie 65, and thus of the rail vehicle 60, is able to be simulated, FIG. 3 schematically illustrates a structure of an embodiment of a claimed industrial application 50. The industrial application 50 comprises a drive motor 52, which may be in the form of an electric motor, combustion engine, hydraulic motor, turbine wheel or flywheel. The drive unit 52 provides torque 25 which is supplied via a first power shaft 51 to a coupling 10. The torque 25 is transmitted from the coupling 10 to an output unit 54 via a second power shaft 53. The output unit 54 is a mechanical application by way of which the function of the industrial application 50 is defined. The industrial application 50 may overall be in the form of a mill, rolling mill, cement mill, sugar mill, extruder, conveying installation, rock crusher, roller crusher, stirring unit, stirring comminutor, rotary furnace, roller press, rolling press, pump, fan, lifting apparatus, scrap press or waste press. In this case, the coupling 10 is designed according to one of the embodiments outlined above, for example as a double-joint coupling 40 as per FIG. 1.

The invention claimed is:

1. A coupling, comprising:
    a claw part; and
    an intermediate piece including a tube piece produced from aluminum or from an aluminum alloy, and a buffer part received in an end region of the tube piece and including elastic damping elements for receiving the claw part, said damping elements being surrounded by the end region radially at an outside in a circumferential direction, wherein a part of the buffer part which is different from the damping elements is produced from a material having a brittleness which is greater than a brittleness of the tube piece.

2. The coupling of claim 1, wherein the claw part includes axially protruding claws received in the end region of the tube piece and being surrounded, at least over a part of an axial extent of the claws, by the end region radially at the outside in the circumferential direction.

3. The coupling of claim 1, wherein the claw part includes axially protruding claws received in the end region of the tube piece and surrounded by the end region radially at the outside in the circumferential direction over an entire axial extent of the claws.

4. The coupling of claim 1, wherein the part of the buffer part is produced from gray cast iron.

5. The coupling of claim 1, wherein the buffer part has a C-shaped profile in a longitudinal section.

6. The coupling of claim 1, wherein the buffer part and the claw part are arranged at the end region of the tube piece, said tube piece having another end region, and further comprising a further claw part, said further claw part and a further buffer part of the intermediate piece being arranged at the other end region of the tube piece.

7. The coupling of claim 1, wherein the buffer part is connected to the tube piece via an adhesive-bonding connection.

8. The coupling of claim 1, wherein the buffer part and the claw part form a coupling joint.

9. The coupling of claim 1, wherein at least one of the elastic damping elements of the buffer part is produced by additive manufacturing.

10. The coupling of claim 1, wherein the elastic damping elements are configured for insertion into the buffer part and removal from the buffer part individually so as to be changeable in a targeted manner according to wear.

11. The coupling of claim 1, further comprising an encircling collar formed as an axial stop on the buffer part and produced from an electrically insulating material for interrupting a creepage current flow between the claw part and the buffer part.

12. The coupling of claim 1, further comprising a cover arranged on the buffer part and produced from an electrically insulating material for interrupting a creepage current flow between a shaft received in the claw part and the buffer part.

13. An industrial application, comprising:
    a drive unit;
    an output unit; and
    a coupling configured to connect the drive unit and the output unit in a torque-transmitting manner, said coupling designed as set forth in claim 1.

14. A bogie for a rail vehicle, said bogie comprising:
    a traction motor;
    a wheel; and
    a coupling configured to connect the traction motor and the wheel in a torque-transmitting manner to one another, said coupling designed as set forth in claim 1.

* * * * *